United States Patent [19]
Tremoulet, Jr.

[11] Patent Number: 6,164,930
[45] Date of Patent: Dec. 26, 2000

[54] APPARATUS FOR REGULATING FLOW OF A PUMPED SUBSTANCE

[75] Inventor: Olivier L. Tremoulet, Jr., Edmonds, Wash.

[73] Assignee: Flow International Corporation, Kent, Wash.

[21] Appl. No.: 09/099,899

[22] Filed: Jun. 18, 1998

[51] Int. Cl.$^7$ ................................................. F04B 17/00
[52] U.S. Cl. ...................... 417/401; 417/507; 137/246.13
[58] Field of Search .................... 417/399, 401, 417/507; 137/246.13; 251/63, 210

[56] References Cited

U.S. PATENT DOCUMENTS

| | | | |
|---|---|---|---|
| 2,622,838 | 12/1952 | Stevenson | 251/31 |
| 2,644,401 | 7/1953 | Ragland | 103/45 |
| 3,094,074 | 6/1963 | Tuckey | 103/44 |
| 3,405,642 | 10/1968 | Freeman | 103/50 |
| 4,026,322 | 5/1977 | Thomas | 137/512 |
| 4,160,408 | 7/1979 | Ulvestad | 99/348 |
| 4,259,051 | 3/1981 | Shatila | 425/133.1 |
| 4,325,296 | 4/1982 | Ukai et al. | 99/468 |
| 4,439,113 | 3/1984 | Owen | 417/394 |
| 4,483,458 | 11/1984 | Minning et al. | 220/320 |
| 4,536,135 | 8/1985 | Olsen et al. | 417/383 |
| 4,565,297 | 1/1986 | Korner et al. | 220/254 |
| 4,659,472 | 4/1987 | Nordlund et al. | 210/609 |
| 4,695,472 | 9/1987 | Dunn et al. | 426/237 |
| 4,707,952 | 11/1987 | Krasnoff | 51/410 |
| 4,723,387 | 2/1988 | Krasnoff | 51/410 |
| 4,789,313 | 12/1988 | Tower et al. | 417/388 |
| 5,037,276 | 8/1991 | Tremoulet, Jr. | 417/567 |
| 5,037,277 | 8/1991 | Tan | 417/567 |
| 5,048,404 | 9/1991 | Bushnell et al. | 99/451 |
| 5,075,124 | 12/1991 | Horie et al. | 426/577 |
| 5,184,434 | 2/1993 | Hollinger et al. | 51/317 |
| 5,213,029 | 5/1993 | Yutaka | 99/474 |
| 5,226,799 | 7/1993 | Raghavan et al. | 417/53 |
| 5,228,394 | 7/1993 | Kanda et al. | 99/453 |
| 5,232,726 | 8/1993 | Clark et al. | 426/519 |

(List continued on next page.)

FOREIGN PATENT DOCUMENTS

| | | |
|---|---|---|
| 0391487A2 | 10/1990 | European Pat. Off. . |
| 0391488A2 | 10/1990 | European Pat. Off. . |
| 0391489A1 | 10/1990 | European Pat. Off. . |
| 0410545A1 | 1/1991 | European Pat. Off. . |
| 0583779A1 | 2/1994 | European Pat. Off. . |
| 0646741A1 | 4/1995 | European Pat. Off. . |
| 0687421A1 | 12/1995 | European Pat. Off. ........ A23L 1/015 |
| 0713654A1 | 5/1996 | European Pat. Off. ........ A23L 3/015 |

(List continued on next page.)

OTHER PUBLICATIONS

Flyer, "Hydro–Pneumatic Accumulators," American Bosch, Springfield, Mass., Sep. 1976.

Flow Technology Proposal No. 8265, "Development of a High–Pressure Abrasive Jet Cutting Tool for Enhancement of Fracturing in Unconventional Natural Gas Formations (Phase 1): Part A. Technical Proposal," Submitted to *Gas Research Institute*, Oct. 1981.

(List continued on next page.)

*Primary Examiner*—Charles G. Freay
*Assistant Examiner*—David J. Torrente
*Attorney, Agent, or Firm*—Seed I.P. Law Group PLLC

[57] ABSTRACT

An apparatus and method for pressure processing a pumpable substance. In one embodiment, the apparatus includes a pressure vessel having an inlet port to receive the pumpable substance and an outlet port to remove the pumpable substance. The inlet and outlet ports can be sealed with movable internal valves. Each of the valves can include a purging fluid channel that terminates in a purging zone located between two seals positioned on the valve. Purging fluid can be pumped through the channel and into the purging zone to create a fluid barrier between a pressurized portion of the pumpable substance and any unpressurized or only partially pressurized portion of the pumpable substance. The purging fluid may also sanitize the purging zone and may remove unpressurized or under-pressurized pumpable substance from the purging zone.

25 Claims, 3 Drawing Sheets

U.S. PATENT DOCUMENTS

| | | |
|---|---|---|
| 5,235,905 | 8/1993 | Bushnell et al. ............................ 99/451 |
| 5,288,462 | 2/1994 | Carter et al. ................................ 422/39 |
| 5,316,745 | 5/1994 | Ting et al. ................................ 422/295 |
| 5,358,212 | 10/1994 | Soltys et al. ......................... 251/210 X |
| 5,370,043 | 12/1994 | Träff et al. ................................. 99/467 |
| 5,439,703 | 8/1995 | Kanda et al. ............................. 426/665 |
| 5,458,901 | 10/1995 | Engler et al. ............................. 426/521 |
| 5,470,547 | 11/1995 | Lhenry ................................... 422/295 |
| 5,493,954 | 2/1996 | Kostohris et al. ........................... 92/168 |
| 5,579,682 | 12/1996 | Bergman et al. .......................... 99/473 |
| 5,585,076 | 12/1996 | Buteau et al. ............................ 422/295 |
| 5,588,357 | 12/1996 | Tomikawa et al. ......................... 99/451 |
| 5,593,714 | 1/1997 | Hirsch ...................................... 426/268 |
| 5,618,025 | 4/1997 | Barron et al. ............................ 251/210 |
| 5,622,105 | 4/1997 | Bergman .................................. 100/245 |
| 5,622,678 | 4/1997 | Hiltawsky et al. ....................... 422/295 |
| 5,658,610 | 8/1997 | Bergman et al. .......................... 426/665 |
| 5,891,505 | 4/1999 | Schuman et al. ......................... 426/665 |
| 5,993,172 | 11/1999 | Schuman et al. ......................... 417/394 |
| 5,996,478 | 12/1999 | Schuman et al. ........................... 99/453 |

FOREIGN PATENT DOCUMENTS

| | | |
|---|---|---|
| 0772981A1 | 6/1997 | European Pat. Off. ......... A23L 3/015 |
| 0786595A2 | 7/1997 | European Pat. Off. . |
| 1 336 044 | 7/1963 | France . |
| 2 087 099 | 12/1971 | France ............................ F04B 49/00 |
| 2379005 | 8/1978 | France . |
| 2381953 | 9/1978 | France . |
| 2 442 018 | 7/1980 | France .............................. A23L 1/32 |
| 2-690854 | 11/1993 | France ............................... B01J 3/00 |
| 2 740 301 | 4/1997 | France ........................... A23L 1/025 |
| 632030 | 7/1936 | Germany . |
| 937866 | 1/1956 | Germany . |
| 4242311 | 8/1993 | Germany . |
| 4406028A1 | 8/1995 | Germany .......................... A61L 2/02 |
| 53-124176 | 10/1978 | Japan ................................ A61L 1/00 |
| 58-150078 | 6/1983 | Japan ................................ F04B 9/12 |
| 62-066862 | 3/1987 | Japan ................................ A01L 2/02 |
| 62-069969 | 3/1987 | Japan ................................ A23C 3/00 |
| 62-122546 | 6/1987 | Japan ............................. A21C 11/20 |
| 63-82667 | 4/1988 | Japan ................................ A61L 2/02 |
| 1-196251 | 8/1989 | Japan ............................. A22C 25/00 |
| 1-300841 | 12/1989 | Japan ............................. A22C 25/00 |
| 2-089598 | 3/1990 | Japan .............................. B30B 11/00 |
| 2-089877 | 3/1990 | Japan ............................... A23L 3/01 |
| 2-182157 | 7/1990 | Japan ............................... A23L 1/01 |
| 2-245146 | 9/1990 | Japan ............................. A23L 1/025 |
| 3-080066 | 4/1991 | Japan ............................... A23L 1/01 |
| 3-147772 | 6/1991 | Japan ............................... A23L 1/20 |
| 3-292863 | 12/1991 | Japan ................................ A23J 3/26 |
| 4-063569 | 2/1992 | Japan ............................... A23L 1/20 |
| 4-108369 | 4/1992 | Japan ............................... A23L 3/01 |
| 4-299967 | 10/1992 | Japan ............................. A23L 3/015 |
| 4-356177 | 12/1992 | Japan ............................. A23L 3/015 |
| 5-023118 | 2/1993 | Japan ............................... A23L 1/01 |
| 5-056752 | 3/1993 | Japan ................................ A23J 3/26 |
| 5-161483 | 6/1993 | Japan ............................. A23L 3/015 |
| 5-227926 | 9/1993 | Japan ............................. A23L 3/015 |
| 5-252920 | 10/1993 | Japan ............................. A23L 3/015 |
| 5-284950 | 11/1993 | Japan ............................. A23L 3/015 |
| 6-014726 | 1/1994 | Japan ............................... A23L 1/01 |
| 6-125753 | 5/1994 | Japan ............................. A23L 3/015 |
| 7-147929 | 6/1995 | Japan ............................. A23L 1/275 |
| 7-180770 | 7/1995 | Japan ............................... F16J 10/00 |
| 8-108459 | 4/1996 | Japan .............................. B29C 47/12 |
| 8-168515 | 7/1996 | Japan ............................... A61L 2/06 |
| 8-267296 | 10/1996 | Japan ................................ B30B 5/00 |
| 2184791 | 7/1987 | United Kingdom ............ F04B 43/10 |
| WO 94/21145 | 9/1994 | WIPO ............................. A23L 3/015 |
| WO 95/21690 | 8/1995 | WIPO ................................ B01J 3/04 |
| WO 96/11588 | 4/1996 | WIPO .............................. A23L 1/212 |
| WO 97/21361 | 6/1997 | WIPO ............................. A23L 3/015 |
| WO97/38591 | 10/1997 | WIPO .............................. A23L 1/212 |
| WO97/43914 | 11/1997 | WIPO ............................. A23L 3/015 |

OTHER PUBLICATIONS

Flow Research Proposal No. 8251, "Experimental and Theoretical Investigation of Metals Cutting by Abrasive Jets: Phase II Program," Prepared for *National Science Foundation*, Apr. 1982.

Flow Industries, Inc., Research and Technology Division Technical Proposal, "Development of an Improved Oil Well Drilling Method Using Fluid–Abrasive Jets," Apr. 1983.

Hashish, M., "Comparative Evaluation of Abrasive–Fluidjet Machining Systems," presented in papers of High Energy Beam Manufacturing Technologies at The Winter Annual Meeting of The American Society of Mechanical Engineers, San Francisco, California, Dec. 10–15, 1989, pp. 13–21.

QUEST Integrated, Inc. Project Summary, "High Velocity Jet Cutting with Liquefied Gases," Jun. 14, 1991.

Balny, et al. "High Pressure and Biotechnology," *Colloque Inserm* vol. 224: pp. 499–507, Sep. 1992.

Rovere, Dr. Pierpaolo, "The Third Dimension of Food Technology," in *Food Technologist High Pressure Processing*, ABB Industria—Milan, Italy; Tetra Pak—Lund, Sweden, 1995.

Hori, K. and T. Sekimoto, "The Development of High Pressure Processor for Food Industries," Mitsubishi Heavy Industries, Ltd., Hiroshima Machinery Works., pp. 1–8.

Flyer, "Floating Piston Accumulators," Greer Olaer Products, Greer Hydraulics, Inc., 5930 West Jefferson Boulevard, Los Angeles, California 90016.

APPARATUS FOR REGULATING FLOW OF A PUMPED SUBSTANCE

TECHNICAL FIELD

This invention relates to methods and apparatus for pressure processing a pumpable substance, for example, food substances and the like.

BACKGROUND OF THE INVENTION

Flowable substances, such as liquid food products, may be treated by exposure to ultrahigh-pressures. For example, liquid food products may be preserved or otherwise chemically or physically altered after exposure to ultrahigh-pressures. In one conventional process, the food substance is loaded into a pressure vessel where it is pressurized to a selected pressure for a selected period of time to achieve the desired physical or chemical change. The vessel is then depressurized and the contents unloaded. The pressure vessel may then be reloaded with a new volume of unprocessed substance and the process may be repeated.

Although current systems produce desirable results, issues of product contamination can arise. Contamination is an important issue in certain applications, particularly those involving pressure-processing of food substances. Contamination can potentially result from contact between the food substance and the outside environment, or can potentially result from exposure of the pressure processed food product to the unprocessed food product.

SUMMARY OF THE INVENTION

The invention relates to methods and apparatus for pressure-processing a pumpable substance, such as a food substance. In one embodiment, the apparatus includes a pressure vessel having an internal surface and at least one port through the internal surface. The apparatus further includes a valve body positioned proximate to the port and movable relative to the port between an open position and a closed position. The valve body has at least one sealing surface that seals the port and restricts motion of the pumpable substance through the port when the valve body is in the closed position. The valve body can further include a channel coupled to a source of purging fluid. The purging fluid can be directed through the channel and into a purging zone located adjacent to the valve body. The purging fluid can then purge the purging zone of unpressurized or underpressurized pumpable substance that might otherwise contaminate the fully pressurized pumpable substance.

In one embodiment, the purging zone may be defined in part by two seals on the valve body. One seal may bear against an internal surface of the port, and the other seal may bear against a surface of the pressure vessel external to the port. The seals may include O-rings or other flexible sealing devices that isolate the purging zone.

In another embodiment, the purging fluid may have sanitizing properties and may accordingly sanitize the purging region. In still another embodiment, the purging fluid may drive the valve body back and forth between the open and closed positions.

DETAILED DESCRIPTION OF THE INVENTION

The present invention is directed toward methods and apparatus for pressure-processing pumpable substances, such as food products. Details of certain embodiments of the invention are set forth in the following description, and in FIGS. 1–3, to provide a thorough understanding of such embodiments. One skilled in the art, however, will understand that the present invention may have additional embodiments, and that they may be practiced without several of the details described in the following description.

A pressure processing apparatus in accordance with one embodiment of the invention includes a pressure vessel having an internal inlet valve that opens to admit a pumpable substance into the vessel. The inlet valve then closes and the pumpable substance is compressed by a piston that is driven by an ultrahigh-pressure fluid. After the pumpable substance has been pressurized, an internal outlet valve opens to remove the pressurized pumpable substance. The inlet and outlet valves can be supplied with a purging fluid that can reduce the likelihood of contaminating the pressurized pumpable substance by creating a fluid barrier between the pressurized and unpressurized pumpable substances.

Figure 1:
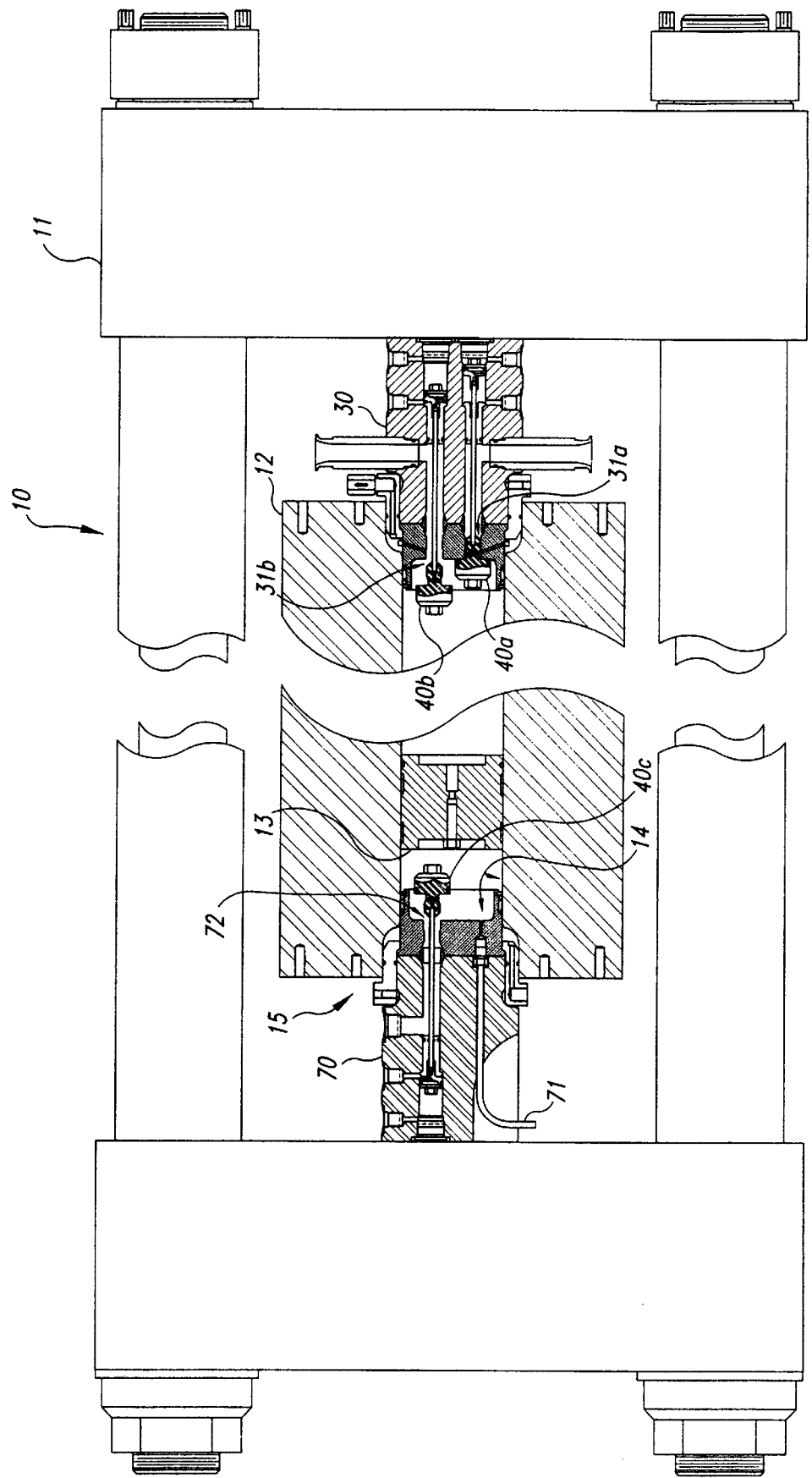
FIG. 1 is a partially broken, partial cross-sectional side elevation view of an apparatus having a pumpable substance valve and a high pressure valve in accordance with an embodiment of the invention.

FIG. 1 is a partial cross-sectional elevation view of a pressure-processing apparatus 10 that includes a pressure vessel 15 having an internal surface 14 capable of withstanding high internal pressures. The pressure vessel 15 may include an open-ended cylinder 12 having a pumpable substance valve 30 at one end and a high pressure valve 70 at the opposite end. A yoke 11 secures the pumpable substance valve 30 and the high pressure valve 70 in place when the pressure vessel 15 is subjected to high internal pressures. The pumpable substance valve 30 includes two ports 31, shown in FIG. 1 as an inlet port 31a that admits unpressurized pumpable substance into the pressure vessel 15, and an outlet port 31b that evacuates the pumpable substance from the pressure vessel once the pumpable substance has been pressurized. Each of the ports 31 can be sealed and unsealed with a valve body 40 (shown as an inlet valve body 40a and an outlet valve body 40b). The pumpable substance can be pressurized by a piston 13 that is driven by an ultrahigh-pressure fluid to move axially within the pressure vessel 15. The ultrahigh-pressure fluid is supplied to the pressure vessel 15 through a high pressure conduit 71 in the high pressure valve 70. The ultrahigh-pressure fluid is initially removed from the pressure vessel 15 through the high pressure conduit 71 until the pressure within the vessel 15 is low enough to allow the low pressure port 72 to open. Once the low pressure port 72 is opened, the remaining ultra-high pressure fluid can be evacuated from the pressure vessel 15 at a higher rate of flow through the low pressure port.

Figure 2:
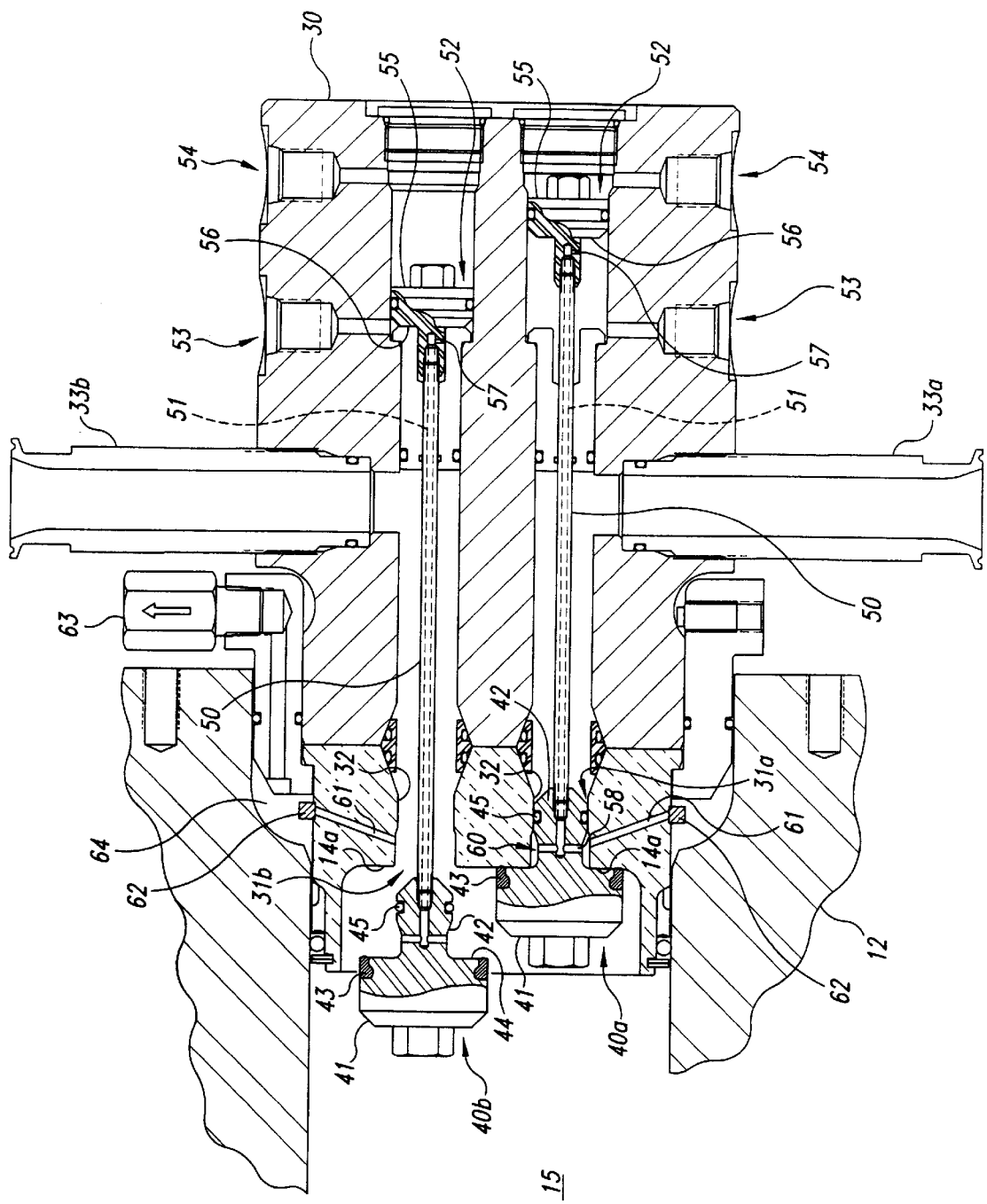
FIG. 2 is a detailed cross-sectional side elevation view of the pumpable substance valve shown in FIG. 1.

FIG. 2 is a detailed partial cross-sectional elevation view of the pumpable substance valve 30 and a portion of the cylinder 12 shown in FIG. 1. As shown in FIG. 2, the pumpable substance valve 30 can include an inlet coupling 33a in fluid communication with the inlet port 31a, and an outlet coupling 33b in fluid communication with the outlet port 31b. The inlet coupling 33a may be coupled to a source of pumpable substance (not shown), to supply the pumpable substance to the pressure vessel 15. The outlet coupling 33b may be coupled to a container or a packaging device to package the pumpable substance once it has been pressure processed.

As mentioned above, the flow of the pumpable substance through the inlet port 31a and the outlet port 31b is controlled by the inlet valve body 40a and the outlet valve body 40b, respectively. Each valve body 40 is connected with a valve stem 50 to a valve piston 52 that drives the valve body 40 axially between an open position (shown by the position of the outlet valve body 40b in FIG. 2) and a closed position (shown by the position of the inlet valve body 40a in FIG. 2). Accordingly, each valve piston 52 has a forward face 55 adjacent an opening port 54 and a rear face 56 adjacent a closing port 53. When pressurized fluid is forced through the opening port 54, it acts against the forward face 55 of the valve piston 52 to drive the valve body 40 axially to its open position. When the pressurized fluid is forced through the closing port 53, it acts against the rear face 56 of the valve piston 52 to drive the valve body 40 axially to its closed position.

Each valve body 40 can include an external portion 41 that remains external to the corresponding port 31 when the valve body is in the closed position, and an internal portion 42 that extends into the port when the valve body is in the closed position. Each valve body 40 may also include one or more seals that restrict the motion of the pumpable substance past the valve body when the valve body is in the closed position. For example, the valve body 40 can include a flexible seal 43 around the periphery of the external portion 41. The flexible seal 43 can be held in place by a lip 44 so as to seal against an internal surface 14a of the pumpable substance valve 30 adjacent the corresponding port 31. The valve body 40 can also include an O-ring 45 around the internal portion 42 that seals against an internal surface 32 of the port 31.

An advantage of a valve body 40 having two seals (e.g., the flexible seal 43 and the O-ring 45) is that the seals reduce the likelihood that the pumpable substance will flow past the valve body when the valve body is in the closed position. For example, the two seals may reduce the likelihood that the pumpable substance will escape past the outlet valve body 40b and enter the outlet port 31b when the outlet valve body 40b is in the closed position and the pumpable substance is pressurized. Such a condition is undesirable because the escaping pumpable substance may not be fully pressure processed, and may therefore contaminate the fully processed substance that subsequently passes through the open outlet port 31b. Furthermore, the two seals on the inlet valve body 40a may prevent unpressurized pumpable substance from passing out of the inlet port 31a and directly into the outlet port 31b without being pressurized, for example when the inlet valve body 40a is in the closed position and the outlet valve body 40b is in the open position.

The valve body 40 can also include a purging zone 60 that may further reduce the likelihood that the fully processed pumpable substance will be contaminated with unprocessed or under-processed pumpable substance. As shown in FIG. 2, the purging zone 60 can be positioned between the O-ring 45 and the flexible seal 43. The purging zone 60 can be further bounded by the internal portion 42 of the valve body 40 and by the inner surface 32 of the port 31. Purging fluid can enter the purging zone 60 through one or more orifices 58 located in the valve body 40 adjacent the purging zone. The orifices can be coupled to a source of purging fluid via a passage 51 in the valve stem 50. In one embodiment, the purging fluid can be the same fluid as is used to drive the valve piston 52. Accordingly, the purging fluid can enter the passage 51 via a passage entrance 57 when the valve body 40 is in the closed position and flow through the valve stem 50 to the purging zone 60. When the valve body 40 is in the open position, the valve piston 52 blocks the passage entrance 57, preventing the purging fluid from entering the passage 51 and therefore preventing the purging fluid from flowing freely into the pressure vessel 15.

While in the purging zone 60, the purging fluid can entrain particles of unprocessed or under-processed pumpable substance that might enter the purging zone by escaping past the flexible seal 43 and/or the O-ring 45. Accordingly, the purging zone 60 forms a fluid barrier between a region containing fully processed pumpable substance and a region containing unprocessed or only partially processed pumpable substance. For example, the purging zone 60 surrounding the outlet valve body 40b may prevent pumpable substance that has not been fully pressure processed from escaping the pressure vessel 15 before the processing cycle is complete. Furthermore, the purging zone 60 surrounding the inlet valve body 40a may prevent unprocessed pumpable substance from flowing past the inlet valve body and out through the outlet port 31b when the outlet valve body 40b is opened to remove the pumpable substance from the vessel 15.

The purging fluid can exit the purging zone 60 through an exit channel 61 to convey unpressurized or under-pressurized pumpable substance away from the corresponding port 31. The exit channel 61 can include a check valve 62 that prevents the purging fluid from re-entering the purging zone 60 when the pressure in the purging zone drops. For example, the check valve 62 can include a flexible elastomeric ring that expands in diameter away from the exit channel 61 to allow the purging fluid to escape, and collapses on the exit channel to prevent the purging fluid from re-entering the purging zone 60. The escaping purging fluid can pass into an annulus 64 and away from the pressure vessel 15 through a relief valve 63. The relief valve 63 can be adjusted to maintain a pressure in the annulus 64 that is low enough to allow the purging fluid to escape and high enough to prevent the pumpable substance from passing out of the pressure vessel 15 between the cylinder 12 and the pumpable substance valve 30.

The purging fluid may include any suitable fluid that can drive the valve bodies 40 back and forth and purge the pumpable substance from the purging zones 60. In one embodiment, the purging fluid may also include a compound that contains iodine to clean and/or sanitize the surfaces adjacent the purging zone 60 as the purging fluid passes through the purging zone 60. Alternatively, the purging fluid may be selected to contain any substance that cleanses the purging zone 60 without adversely affecting the characteristics of the pumpable substance. Accordingly, the purging fluid may further reduce the likelihood that the fully pressure processed pumpable substance is contaminated by under-pressurized or unpressurized pumpable substance. In addition, the purging fluid may reduce the likelihood that particulates (which might be included in the pumpable substance) will become lodged between the valve body 40 and the port 31 where they can prevent the valve body from fully closing.

Figure 3:
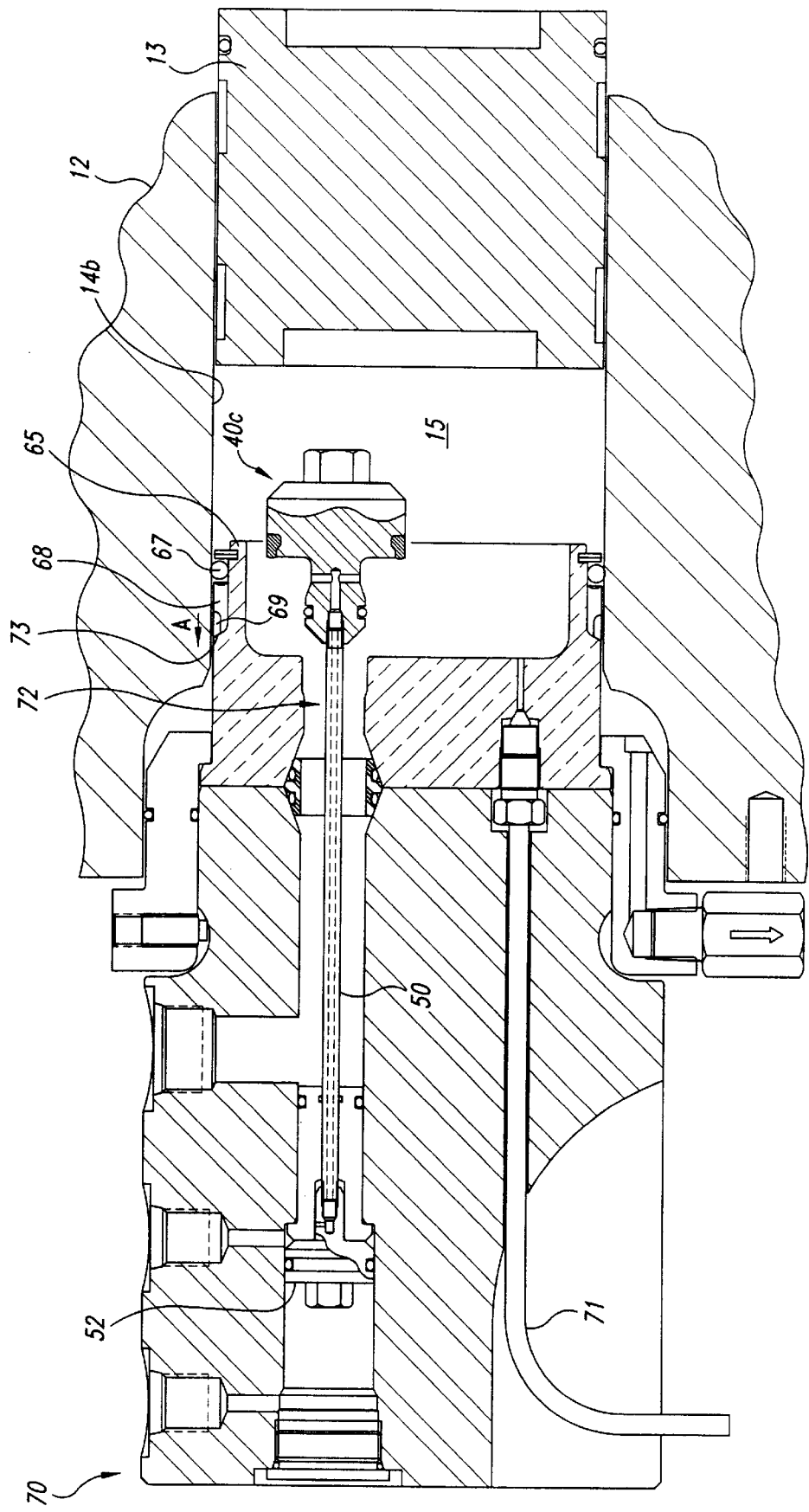
FIG. 3 is a detailed cross-sectional side elevation view of the high pressure valve shown in FIG. 1.

FIG. 3 is a detailed partial cross-sectional side elevation view of the high pressure valve 70 and high pressure conduit 71 shown in FIG. 1. The high pressure conduit 71 can be coupled to a source of ultrahigh-pressure fluid to drive the piston 13 in the pressure vessel 15. The ultrahigh-pressure fluid can be supplied by a device such as a model No. 25X available from Flow International Corp. of Kent, Washington. Such devices are capable of generating pressures up to 55,000 psi; however, pressures higher or lower than this value may be suitable as well, so long as the pressure is sufficient to produce the desired effect on the pumpable substance.

The ultrahigh-pressure fluid is evacuated from the pressure vessel 15 through the low pressure port 72 as the pressure vessel is filled with the pumpable substance. The low pressure port 72 may be opened and closed with the low pressure valve body 40c in a manner similar to that discussed above with reference to the inlet and outlet valve bodies 40a and 40b shown in FIG. 2. In one embodiment, the low pressure valve body 40c, the valve stem 50, and the valve piston 52 shown in FIG. 3 may be identical to the valve bodies, valve stems and valve pistons shown in FIG. 2 to provide for commonality of parts. However, because the low pressure port 72 is not exposed to the pumpable substance, the high pressure valve 70 need not include a purging zone 60 (FIG. 2) or an exit channel 61 (FIG. 2).

As shown in FIG. 3, the high pressure valve 70 can include a sealing flange 65 that is sealably coupled to an internal surface 14b of the cylinder 12 to seal the high pressure valve 70 within the cylinder. The sealing flange 65 is spaced apart from the internal surface 14b to accommodate an O-ring 67 that sealably engages both the internal surface 14b and the flange 65. The high pressure valve 70 can also include an elastomeric seal 68 adjacent the O-ring, and an anti-extrusion ring 69 adjacent the elastomeric seal, both of which are seated against an aft surface 73 of the sealing flange 65. The elastomeric seal 68 may comprise a polymer, such as an ultra-high molecular weight polyethylene, and the anti-extrusion ring 69 may include a metal, such as bronze. The aft surface 73 of the sealing flange 65 may be inclined so that as the elastomeric seal 68 is forced aft in the direction indicated by arrow A (for example, when the pressure vessel 15 is pressurized), the elastomeric seal 68 forces the anti-extrusion ring 69 outward toward the cylinder 12, to prevent the elastomeric seal 68 from extruding into a small gap that might exist between the high pressure valve 70 and the cylinder 12. This arrangement may be advantageous because it reduces wear on the elastomeric seal 68. A similar arrangement may be used to seal the pumpable substance valve 30 (FIG. 2) to the cylinder 12.

Operation of an embodiment of the apparatus 10 is best understood with reference to FIGS. 1 and 2. Beginning with FIG. 2, the outlet valve body 40b is closed by supplying purging fluid through the corresponding closing port 53. The purging fluid acts against the rear face 55 of the corresponding valve piston 52 to draw the outlet valve body 40b into the outlet port 3 lb. The O-ring 45 seals against the internal surface 32 of the port 31 and the flexible seal 43 seals against the internal surface 14a of the pumpable substance valve 30. The purging fluid enters the purging zone 60 of the outlet valve body 40b through the corresponding purging fluid passage 51, and exits the purging zone through the corresponding exit channel 61. The purging fluid continues to flow as long as the outlet valve body is in the closed position. The inlet valve body 40a is then moved to its open position by applying purging fluid to the corresponding opening port 54. The purging fluid acts against the forward face 55 of the corresponding valve piston 52 to drive the inlet body 40a to the open position.

Referring now to FIG. 1, the low pressure valve body 40c is moved to its open position in a manner similar to that discussed above with reference to the inlet valve body 40a. The pumpable substance is then introduced through the inlet port 31a and into the pressure vessel 15 to move the piston 13 toward the high pressure valve 70, driving residual high pressure fluid located between the piston 13 and the high pressure valve 70 out through the low pressure port 72. The low pressure valve 40c and the inlet valve body 40a are then closed and the ultrahigh-pressure fluid is introduced to the pressure vessel 15 through the high pressure conduit 71. The ultrahigh-pressure fluid drives the piston 13 toward the pumpable substance valve 30 to compress the pumpable substance within the vessel. When the desired pressure is obtained, the flow of ultrahigh-pressure fluid is halted and the pumpable substance is allowed to remain at an elevated pressure for a selected period of time. When the selected period of time has elapsed, the pressure within the pressure vessel 15 is relieved by initially passing the ultra-high pressure fluid out of the pressure vessel 15 through the high pressure conduit 71. The valve bodies 40b and 40c are then opened and low pressure fluid is supplied through the low pressure port 72 to move the piston 13 toward the outlet valve body 40b and remove the pumpable substance from the pressure vessel 15 through the outlet port 31b. The cycle can then be repeated with a new quantity of pumpable substance.

One advantage of an embodiment of the apparatus 10 shown in FIGS. 1–3 is that the plurality of seals on each valve body 40 reduces the likelihood that the pressure processed pumpable substance will become contaminated with unpressurized or under-pressurized pumpable substance. Another advantage is that the two seals may define a purging zone 60 between the fully pressurized pumpable substance and the unpressurized pumpable substance. A purging fluid may be passed through the purging zone 60 to remove under-pressurized pumpable substance from the purging zone, creating a fluid barrier between the pressurized pumpable substance and the unpressurized or under-pressurized pumpable substance. Furthermore, the purging fluid may sanitize the surfaces of the apparatus in the purging zone. Both the purging function and the sanitizing function can be completed while the apparatus is pressurized and without having to access the interior of the pressure vessel 15.

Yet another advantage of the apparatus 10 shown in FIGS. 1–3 is that the seal 68 between the cylinder 12 and the valves 30 and 70 may include an anti-extrusion ring 69 positioned adjacent an inclined surface of the valves. The anti-extrusion ring 69 moves outward under pressure to reduce wear on the seal and to reduce the likelihood of a leak developing between the cylinder 12 and the valves 30 and 70.

From the foregoing it will be appreciated that, although specific embodiments of the invention have been described herein for purposes of illustration, various modifications may be made without deviating from the spirit and scope of the invention. For example, the flexible seal 43 and the O-ring 45 can be arranged differently on the valve body 40 so long as they provide a purging zone 60 between the pressurized pumpable substance and the unpressurized or under-pressurized pumpable substance. Alternatively, the two seals alone (without the purging fluid) can be sufficient to isolate the pressurized pumpable substance. Where the purging fluid is provided, the purging fluid can be delivered to the purging zone 60 via the valve stem 50, as shown in FIGS. 1–3, or alternatively, the purging fluid can be supplied directly through the inner surface 32 of the port 31. In still a further alternate embodiment, the piston 13 can be replaced with another pressurizing means, for example, a bladder or a bellows. that expands and contracts within the pressure vessel 15 to pressurize the pumpable substance and to isolate the pumpable substance from the high pressure fluid. Accordingly, the invention is not limited except as by the appended claims.

What is claimed is:

1. An apparatus for pressure-processing a pumpable food substance, comprising:

a pressure vessel having an internal surface, a plurality of ports through the internal surface including a pumpable substance inlet port coupleable to a source of pumpable food substance, a pumpable substance outlet port, a fluid inlet port coupleable to a source of ultrahigh-pressure fluid, and a fluid outlet port;

at least one valve body disposed in one of the ports and movable relative to the port between an open position and a closed position, the valve body having a first seal that sealably engages the internal surface of the pressure vessel adjacent the port when the valve body is in the closed position and a second seal that sealably engages an inner surface of the port when the valve body is in the closed position, the first seal being disengaged from the internal surface of the pressure vessel when the valve body is in the open position, the second seal being disengaged from the inner surface of the port when the valve body is in the open position; and pressurizing means positioned within the pressure vessel between the pumpable substance inlet port and the fluid inlet port to separate the pumpable substance from the ultrahigh-pressure fluid and pressurize the pumpable substance when the ultrahigh-pressure fluid is introduced through the fluid inlet port.

2. The apparatus of claim 1 wherein the pressure vessel includes a cylindrical portion having an open end and a pumpable substance valve sealably positioned in the open end, the internal wall of the pressure vessel including an internal wall of the cylindrical portion and an internal wall of the pumpable substance valve, the one port extending through the internal wall of the pumpable substance valve.

3. The apparatus of claim 2, wherein the pumpable substance valve has an axially extending sealing surface annularly spaced apart from the internal wall of the cylindrical portion, the pumpable substance valve further having an inclined surface between the sealing surface and the internal wall of the cylindrical portion, the inclined surface being disposed at an obtuse angle to the sealing surface, the apparatus further comprising:

a valve seal between the sealing surface of the pumpable substance valve and the internal wall of the cylindrical portion; and a ring between the valve seal and the internal wall of the cylindrical portion adjacent the inclined surface, the ring engaging the internal wall of the cylindrical portion when the valve seal applies an axial pressure to the ring.

4. The apparatus of claim 1 wherein the pressurizing means includes a piston that sealably engages the internal wall of the pressure vessel between the fluid inlet port and the pumpable substance inlet port and is movable within the pressure vessel between the two inlet ports.

5. The apparatus of claim 1 wherein the valve body includes a first portion that faces the internal surface of the pressure vessel adjacent the port and the first seal includes a resilient elastic material attached to the first portion, the elastic material being between the first portion and the internal surface of the pressure vessel and sealably engaging the internal surface of the pressure vessel adjacent the port when the valve body is in the closed position.

6. The apparatus of claim 5 wherein the valve body includes a second portion generally transverse to the first portion and aligned with an axis of the port, the second portion being received by the port when the valve body is in the closed position, further wherein the second seal includes an O-ring disposed about the second portion to sealably engage an internal surface of the port when the valve body is in the closed position.

7. The apparatus of claim 1, further comprising a valve piston coupled to the valve body and having a first face and a second face facing away from the first face, the first face being in fluid communication with a source of pressurized fluid to move the valve body to the open position, the second face being in fluid communication with the source of pressurized fluid to move the valve body to the closed position.

8. The apparatus of claim 7 wherein the valve body has a channel therethrough with first and second spaced apart openings, the first opening being coupled to a source of sanitizing fluid to provide sanitizing fluid to a region of the valve body adjacent the second opening.

9. An apparatus for pressure-processing a pumpable food substance, comprising:

a pressure vessel having an internal surface and at least one port through the internal surface;

a valve body disposed in the port and movable relative to the port between an open position and a closed position, the valve body having a sealing surface that faces the internal surface of the pressure vessel adjacent the port when the valve body is in the closed position;

a flexible seal attached to the sealing surface, the flexible seal engaging the internal surface of the pressure vessel adjacent the port when the valve body is in the closed position, the flexible seal being spaced apart from the port when the valve body is in the open position; and pressurizing means positioned within the pressure vessel proximate to the port to pressurize the pumpable food substance when the pumpable food substance is introduced into the pressure vessel.

10. The apparatus of claim 9 wherein the pressure vessel includes a cylindrical portion having an open end and a pumpable substance valve positioned in the open end the internal surface of the pressure vessel including an internal wall of the cylinder and an internal wall of the pumpable substance valve, the one port extending through the internal wall of the pumpable substance valve.

11. The apparatus of claim 9 wherein the flexible seal extends around a periphery of the sealing surface and extends from the sealing surface toward the port.

12. The apparatus of claim 9 wherein the valve body includes a lip that engages the flexible seal to at least restrict motion of the flexible seal away from the valve body.

13. An apparatus for pressure-processing a pumpable substance, comprising:

a pressure vessel having an internal surface and at least one port through the internal surface;

a valve body disposed in the port and movable relative to the port between an open position and a closed position, the valve body having at least one sealing surface that seals the port and at least restricts motion of the pumpable substance through the port when the valve body is in the closed position, the valve body having a channel with a first opening coupled to a source of purging fluid and a second opening proximate to the port to direct purging fluid into a purging zone adjacent the valve body.

14. The apparatus of claim 13 wherein the pressure vessel includes a cylindrical portion having an open end and a pumpable substance valve positioned in the open end, the internal surface of the pressure vessel including an internal wall of the cylinder and an internal wall of the pumpable substance valve, the one port extending through the internal wall of the pumpable substance valve.

15. The apparatus of claim 13 wherein the valve body has first and second spaced apart seals that engage at least one of the internal surface of the pressure vessel and an internal surface of the port, the first opening of the valve body being between the seals, the valve body being spaced apart from at least one of the internal surfaces in the purging zone, further wherein the pressure vessel has a fluid exit channel in fluid communication with the purging zone to remove the purging fluid from the purging zone.

16. The apparatus of claim 15 wherein the exit channel is connected to a check valve that is movable relative to the exit channel between an open position wherein the check valve seals the exit channel to at least restrict motion of the purging fluid through the exit channel and an open position wherein the check valve opens the exit channel for the purging fluid to pass therethrough.

17. The apparatus of claim 16 wherein the pressure vessel includes a cylindrical portion having an open end and a pumpable substance valve having a corresponding cylindrical wall positioned in the open end, further wherein the one port extends through the cylindrical wall of the pumpable substance valve, the exit channel extends through the cylindrical wall of the pumpable substance valve, and the check valve includes a resilient flexible ring disposed around the cylindrical wall of the pumpable substance valve and over an opening in the exit channel.

18. The apparatus of claim 13 wherein the pressure vessel has an interior volume, the port is coupled to a source of pumpable food substance, and the purging zone is located between the source of pumpable food substance and the interior volume of the vessel.

19. The apparatus of claim 13, further comprising a valve piston coupled to the valve body and having first and second opposite faces, the first face being in fluid communication with the source of purging fluid to move the valve body to the open position, the second face being in fluid communication with the source of purging fluid to move the valve body to the closed position.

20. The apparatus of claim 19, further comprising a stem that extends axially through the port between the valve body and the valve piston, wherein the channel extends through the stem.

21. The apparatus of claim 13, further comprising the purging fluid, wherein the purging fluid is selected to sanitize at least a portion of the valve body and the port.

22. The apparatus of claim 21 wherein the purging fluid contains iodine.

23. An apparatus for pressure-processing a pumpable substance, comprising:
    a pressure vessel having an internal surface and at least one port through the internal surface;
    a valve body proximate to the port and movable relative to the port between an open position and a closed position, the valve body having at least one sealing surface that seals the port and at least restricts motion of the pumpable substance through the port when the valve body is in the closed position, the valve body having a channel with a first opening coupled to a source of purging fluid and a second opening proximate to the port to direct purging fluid into a region adjacent the valve body.

24. The apparatus of claim 23 wherein the valve body extends into to the port.

25. The apparatus of claim 24, further comprising a valve piston coupled to the valve body and having first and second opposite faces, the first face being in fluid communication with the source of purging fluid to move the valve body to the open position, the second face being in fluid communication with the source of purging fluid to move the valve body to the closed position.

* * * * *

UNITED STATES PATENT AND TRADEMARK OFFICE
CERTIFICATE OF CORRECTION

PATENT NO : 6,164,930
DATED : December 26, 2000
INVENTOR(S) : Olivier L. Tremoulet, Jr.

It is certified that errors appear in the above-identified patent and that said Letters Patent are hereby corrected as shown below:

Claim 10, column 8, line 40 "the open end the" should read --the open end, the--.

Signed and Sealed this

Eighth Day of May, 2001

Attest:

NICHOLAS P. GODICI

Attesting Officer      Acting Director of the United States Patent and Trademark Office